(12) United States Patent
Bender et al.

(10) Patent No.: US 8,935,495 B2
(45) Date of Patent: Jan. 13, 2015

(54) STORAGE MANAGEMENT IN A VIRTUAL ENVIRONMENT

(75) Inventors: Stefan Bender, Woerrstadt (DE); Nils Haustein, Soergenloch (DE); Christian Mueller, Dichtelbach (DE); Dominic Mueller-Wicke, Weilburg (DE)

(73) Assignee: International Business Machines Corporation, Armonk, NY (US)

( * ) Notice: Subject to any disclaimer, the term of this patent is extended or adjusted under 35 U.S.C. 154(b) by 213 days.

(21) Appl. No.: 13/590,486

(22) Filed: Aug. 21, 2012

(65) Prior Publication Data

US 2014/0059306 A1 Feb. 27, 2014

(51) Int. Cl.
*G06F 11/00* (2006.01)
*G06F 11/14* (2006.01)
*G06F 11/20* (2006.01)

(52) U.S. Cl.
CPC ........ *G06F 11/1456* (2013.01); *G06F 11/2071* (2013.01)
USPC ....................................................... 711/162

(58) Field of Classification Search
USPC ....................................................... 711/162
See application file for complete search history.

(56) References Cited

U.S. PATENT DOCUMENTS

| | | | |
|---|---|---|---|
| 6,757,778 B1 | 6/2004 | van Rietschote | |
| 7,441,096 B2 | 10/2008 | Kitamura | |
| 7,546,431 B2 | 6/2009 | Stacey et al. | |
| 8,006,111 B1 * | 8/2011 | Faibish et al. | 713/324 |
| 8,055,864 B2 | 11/2011 | Sawdon et al. | |
| 8,166,260 B2 | 4/2012 | Prabhu et al. | |
| 2005/0071560 A1 * | 3/2005 | Bolik | 711/117 |
| 2009/0228655 A1 | 9/2009 | Yamane | |
| 2009/0265516 A1 * | 10/2009 | Prabhu et al. | 711/161 |
| 2010/0070725 A1 * | 3/2010 | Prahlad et al. | 711/162 |
| 2010/0153617 A1 | 6/2010 | Miroshnichenko et al. | |
| 2011/0010518 A1 | 1/2011 | Kavuri et al. | |

OTHER PUBLICATIONS

Ma et al., "Experiences with Hierarchical Storage Management Support in Blue Whale File System" 2010 International Conference on Parallel and Distributed Computing, Applications and Technologies (PDCAT), Dec. 8-11, 2010, pp. 369-374 [online], [retrieved on May 16, 2012]. Retrieved from the Internet <URL: http://ieeexplore.ieee.org/xpl/freeabs_all.jsp?arnumber=5704396>.

Vengerov, "A Reinforcement Learning Framework for Online Data Migration in Hierarchical Storage Systems" The Journal of Supercomputing, vol. 43 Issue 1, Jan. 2008, Kluwer Academic Publishers [online], [retrieved on Mar. 30, 2012]. Retrieved from the Internet <URL: https://labs.oracle.com/people/vengerov/StorageManagement.pdf>.

* cited by examiner

*Primary Examiner* — Aimee Li
*Assistant Examiner* — Craig Goldschmidt
(74) *Attorney, Agent, or Firm* — Maeve McCarthy

(57) ABSTRACT

A method, computer program product, and system for managing storage space in a virtualized computing environment. The method includes a computer determining, by one or more computer processors, that a virtual computer system has reached a threshold level of minimum available storage space. The storage space of the computer system is searched for an inactive snapshot file. When the inactive snapshot file is located, the inactive snapshot file is moved to a secondary storage.

16 Claims, 8 Drawing Sheets

| IDENTIFIER OF THE SNAPSHOT | ORIGINAL LOCATION | MIGRATION LOCATION | SIZE OF SNAPSHOT FILE |
|---|---|---|---|
| A | [datastore1]VM1-Snapshot1.vmsn | [SANstore1]/Migration/VM1-Snapshot1.vmsn | 500MB |
| B | [datastore1]VM2-Snapshot1.vmsn | [SANstore1]/Migration/VM2-Snapshot1.vmsn | 1.2 GB |
| C | [datastore1]VM3-Snapshot1.vmsn | [SANstore1]/Migration/VM3-Snapshot1.vmsn | 60 GB |

FIG. 7

STORAGE MANAGEMENT IN A VIRTUAL ENVIRONMENT

FIELD OF THE INVENTION

The present invention relates generally to virtualized computing environments and more particularly to storage management within the virtualized environment.

BACKGROUND

In system virtualization, multiple virtual computing systems are created within a single physical computing system. The physical system can be a stand-alone computer, or alternatively, a computing system utilizing clustered computers and components. Virtual systems are independent operating environments that use virtual resources made up of logical divisions of physical resources such as processors, memory, and input/output (I/O) adapters. System virtualization is implemented through some managing functionality, typically hypervisor technology. Hypervisors, also called virtual machine managers (VMMs), use a thin layer of code in software or firmware to achieve fine-grained, dynamic resource sharing. Hypervisors are the primary technology for system virtualization because they provide the greatest level of flexibility in how virtual resources are defined and managed.

Hypervisors provide the ability to divide physical computing system resources into isolated logical partitions. Each logical partition operates like an independent computing system running its own operating system (e.g., a virtual system). Operating systems running in a virtualized environment are often referred to as "guest machines." Exemplary operating systems include AIX®, IBM® i, Linux®, and the virtual I/O server (VIOS). Hypervisors can allocate dedicated processors, I/O adapters, and memory to each logical partition and can also allocate shared processors to each logical partition. Unbeknownst to the logical partitions, the hypervisor creates a shared processor pool from which the hypervisor allocates virtual processors to the logical partitions as needed. In other words, the hypervisor creates virtual processors from physical processors so that logical partitions can share the physical processors while running independent operating environments.

The hypervisor can also dynamically allocate and de-allocate dedicated or shared resources (such as processors, I/O, and memory) across logical partitions while the partitions are actively in use. This is known as dynamic logical partitioning or dynamic LPAR and allows the hypervisor to dynamically redefine all available system resources to reach optimum capacity for each partition.

In addition to creating and managing the logical partitions, the hypervisor manages communication between the logical partitions via a virtual switch. To facilitate communication, each logical partition may have a virtual adapter for communication between the logical partitions, via the virtual switch. The type of the virtual adapter depends on the operating system used by the logical partition. Examples of virtual adapters include virtual Ethernet adapters, virtual Fibre Channel adapters, virtual Small Computer Serial Interface (SCSI) adapters, and virtual serial adapters.

Virtual adapters are often implemented through a VIOS partition which manages the physical I/O adapters (SCSI disks, Fibre Channel disks, Ethernet, or CD/DVD optical devices). The other logical partitions may be considered "clients" or virtual I/O clients (VIOCs) to the VIOS. The VIOS can provide virtualized network resources to the other logical partitions via a Shared Ethernet adapter (SEA). The SEA bridges a physical Ethernet adapter with the respective virtual adapters and may apportion network bandwidth.

In virtual environments and in data storage systems generally, snapshots are a common way to preserve the state and data of a virtual machine at a specific point in time. Snapshots include both the virtual machine's power state and the data that is stored within the virtual machine at the time the snapshot was captured. The data includes all of the files that make up the virtual machine, including disks, memory, and other devices, such as virtual network interface cards. Snapshots are preserved as a guide for restoring the virtual machine in the event that it fails. A virtual machine provides several operations for creating and managing snapshots and snapshot chains, allowing a user to create snapshots, revert to any snapshot in the chain, and remove snapshots. In a virtual environment, the hypervisor includes a snapshot manager to manage the snapshots for virtual machines.

When a snapshot is created, it contains a collection of virtual machine (VM) disks (referred to as the VM disk file or VM disk) and delta files, and a file containing the virtual machine's snapshot information, which is the primary source of information for the snapshot manager. All data pertaining to the virtual machine can be read from the snapshot files. The VM disk contains the components of the virtual machine, and when a snapshot is created, the original VM disk is set to read only. All changes to the virtual machine after the point in time the snapshot was created are stored in the delta file. The delta files may be referred to as child disks, and the child disks can later be considered parent disks for future child disks.

New snapshots, and corresponding child disks, can be created from existing snapshots, resulting in snapshot chains. Multiple snapshot chains may be created from the same source snapshot, which creates snapshot trees. New branches added to an existing tree may cause the existing snapshot chains to become irrelevant, resulting in inactive disks on the old branches and active disks on the new branches, or in the active snapshot chain. Inactive disks can have no impact on the virtual machine and are not used for processing of the guest machine. The original VM disk, all snapshots, and child disks are stored in the same local data store on the underlying physical computing system's hardware.

SUMMARY

Embodiments of the present invention disclose a method, computer program product, and system for managing storage space in a virtualized computing environment. The method includes determining, by one or more computer processors, that a computer system hosting a plurality of virtual computers has reached a threshold level of minimum available storage space. The method further includes searching the storage space of the computer system for an inactive snapshot file. When the inactive snapshot file is located, the inactive snapshot file is moved to a secondary storage.

BRIEF DESCRIPTION OF THE SEVERAL VIEWS OF THE DRAWINGS

FIG. 7 illustrates an exemplary table of original location, migration location, and size information of migrated inactive snapshot child disks and inactive block disks, in accordance with an embodiment of the present invention.

DETAILED DESCRIPTION

Figure 1:
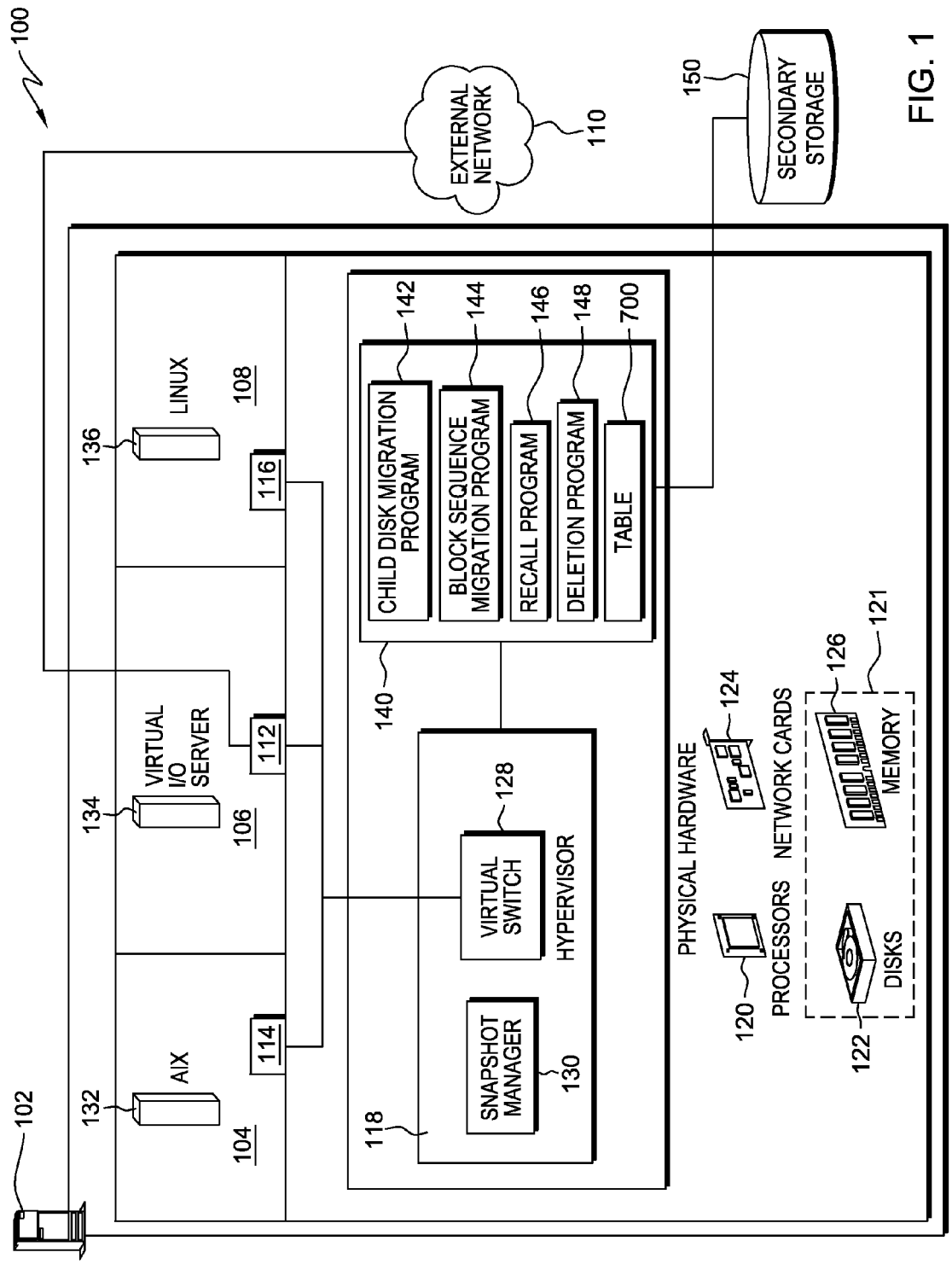
FIG. 1 illustrates a virtualized computer environment for migrating inactive data files to secondary storage, in accordance with an embodiment of the present invention.

Embodiments of the present invention will now be described in detail with reference to the accompanying drawings. FIG. 1 illustrates a virtualized computer environment 100 for migrating inactive data files to secondary storage, in accordance with an embodiment of the present invention. Virtualized computer environment 100 includes computer 102. Computer 102 is divided into multiple logical partitions 104, 106, and 108. In the illustrated example, each of the respective logical partitions 104, 106, and 108 runs an independent operating environment, such as an operating system (OS). Logical partition 104 runs an OS 132, which can be AIX®, logical partition 106 runs an OS 134, which can be a VIOS, and logical partition 108 runs an OS 136, which can be Linux®. Other operating environments and combinations of operating environments may be used. In various embodiments of the present invention, any number of partitions may be created and may exist on separate physical computers of a clustered computer system.

Communications from external network 110 may be routed through Shared Ethernet adapter (SEA) 112 on logical partition 106 to virtual adapters 114 and 116 on respective logical partitions 104 and 108. Communications from virtual adapters 114 and 116 on respective logical partitions 104 and 108 may be routed through SEA 112 on VIOS partition 106 to external network 110. In an alternative embodiment, physical network adapters may be allocated to logical partitions 104, 106, and 108.

Hypervisor 118 forms logical partitions 104, 106, and 108 from the physical resources of computer 102 through logical sharing of designated processors 120, storage disks 122, network cards 124, and/or memory 126 among logical partitions 104, 106, and 108. Hypervisor 118 performs standard operating system functions and manages communication between logical partitions 104, 106, and 108 via virtual switch 128. Virtual switch 128 is a software program that allows one virtual machine to communicate with another. Virtual switch 128 may be embedded into virtualization software or may be included in a server's hardware as part of its firmware. Hypervisor 118 also includes snapshot manager 130, which manages virtual machine snapshots and snapshot trees. The source for any snapshot is a virtual machine that includes at least one OS and one or more applications, for example, logical partitions 104, 106, and 108.

Storage management module 140 is connected to hypervisor 118 and includes child disk migration program 142, block sequence migration program 144, recall program 146 and deletion program 148 for management of virtual environment storage. Each of the programs included in storage management module 140 maintain information regarding file location and file size in table 700, which can be included in storage management module 140. While in FIG. 1, programs 142, 144, 146 and 148 are included within storage management module 140, one of skill in the art will appreciate that in other embodiments, programs 142, 144, 146, and 148, or a combination thereof, may be separate from storage management module 140. In an alternate embodiment, storage management module 140 may run on a separate computer from computer 102 within virtualized computer environment 100.

Virtual environment storage can include shared virtual machine storage, contained in the physical hardware of computer 102 in disks 122 and/or memory 126, and secondary storage 150. In embodiments of the present invention, the physical hardware storage can be referred to as local data store 121, as shown by the dashed line in FIG. 1. Secondary storage 150 may be disk storage attached via a dedicated storage area network, or SAN, to computer 102, or secondary storage may be provided through network file system (NFS) shares or tape provided by a server attached via TCP/IP. When a storage threshold level is reached in local data store 121, the programs included in storage management module 140 run to free up space for additional data files.

Child disk migration program 142 identifies inactive child disks in a virtual machine snapshot tree 200 (shown in FIG. 2), which can be requested from snapshot manager 130, and migrates the identified child disks to secondary storage 150. Block sequence migration program 144 may run independent of child disk migration program 142. Additionally, block sequence migration program 144 may run based on results of child disk migration program 142, for example, when the child disk migration program does not free up enough space in local data store 121. Block sequence migration program 144 searches the active snapshot chain in snapshot tree 200 for a child disk with the highest number of inactive blocks. Inactive blocks are data blocks in the active snapshot chain that are modified and the change copied to the child disk. The data blocks are no longer active in the parent disk and therefore can be considered migration candidates to free up local storage space. In order for inactive blocks to be migrated to secondary storage 150, the collective amount of inactive blocks located should be higher than the space needed on local storage. Migration of a small number of blocks may reduce efficiency.

After the inactive child disks and/or inactive blocks are migrated to secondary storage 150, child disk migration program 142 and block sequence migration program 144 create stub files for the migrated child disk or block, respectively, in local data store 121. A stub file is a file that contains metadata information for the previously migrated inactive disk or inactive block sequence. To a user or program accessing the stub file on local data store 121, the stub file appears to be the normal file. The stub file may include a logical link to the migrated child disk or block located on secondary storage 150.

Recall program 146 runs when a user or a program accesses a stub file located on local data store 121. Recall program 146 automatically moves the previously migrated child disks or blocks corresponding to the accessed stub file from secondary storage 150 back to local data store 121. The user or program remains unaware of the move. Deletion program 148 deletes inactive child disks and inactive block sequences on secondary storage 150 when deletion is requested by snapshot manager 130.

Figure 2:
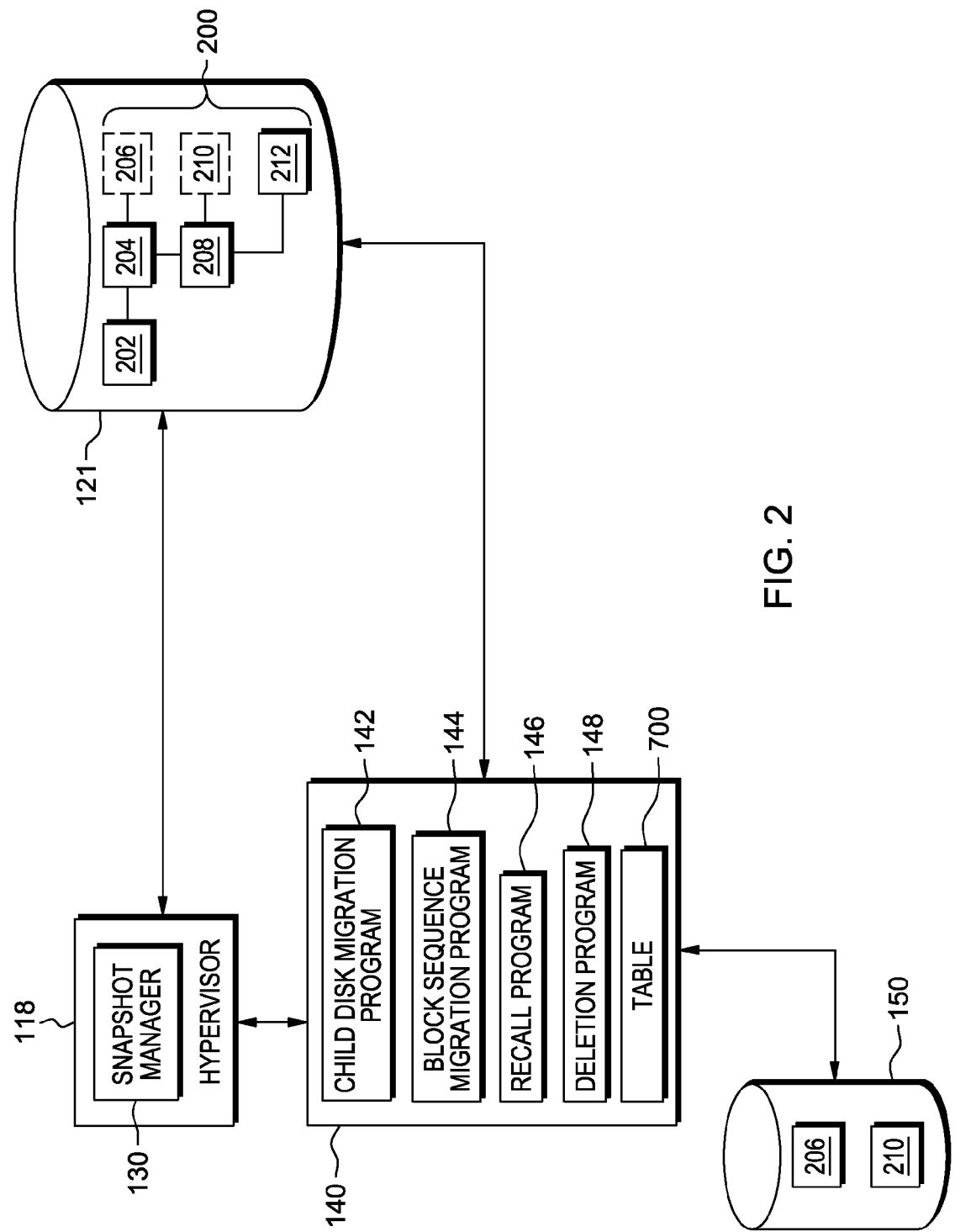
FIG. 2 depicts data flow of storage management within a virtual machine environment, in accordance with an embodiment of the present invention.

FIG. 2 depicts data flow of storage management within a virtual machine environment, in accordance with an embodiment of the present invention.

Hypervisor 118 is connected to local data store 121 on computer 102, and to storage management module 140, which allows for communication between snapshot manager 130 on hypervisor 118, data store 121 and module 140. Local data store 121 contains virtual machine files, which include parent and child disks pertaining to snapshots. Snapshots are arranged in snapshot tree 200. In FIG. 2, for example, snapshot 212 is the active snapshot and the active snapshot chain includes parent disk 202, active child disks 204, 208, and active snapshot 212. Inactive child disks are those not included on the active snapshot chain leading to active snapshot 212, for example, the inactive child disks in FIG. 2 are 206 and 210. Parent disk 202 contains information regarding the operating system or application pertaining to the virtual machine. Snapshot manager 130 manages snapshot tree 200 and responds to requests for information regarding snapshot tree 200 from storage management module 140. Storage management module 140 is connected to local data store 121 in order to access the snapshot parent and child disks and the storage management module is connected to at least one secondary storage 150.

The programs 142, 144, 146, and 148 on storage management module 140 are responsible for migrating, recalling and deleting files between local data store 121 and secondary storage 150. For example, child disk migration program 142 creates a stub file for each of the inactive child disks 206 and 210 on local data store 121 after migrating inactive child disks to secondary storage 150. When a user or program accesses either stub file 206 or stub file 210, recall program 146 moves the migrated child disk from secondary storage 150 back to local data store 121. Also, programs 142, 144, 146, and 148 maintain the information stored in table 700, which is located on storage management module 140. Table 700 contains information including the name of the migrated snapshot file, the original location of the file on local data store 121, the migration location of the file in secondary storage 150 and the size of the migrated file.

Figure 3:
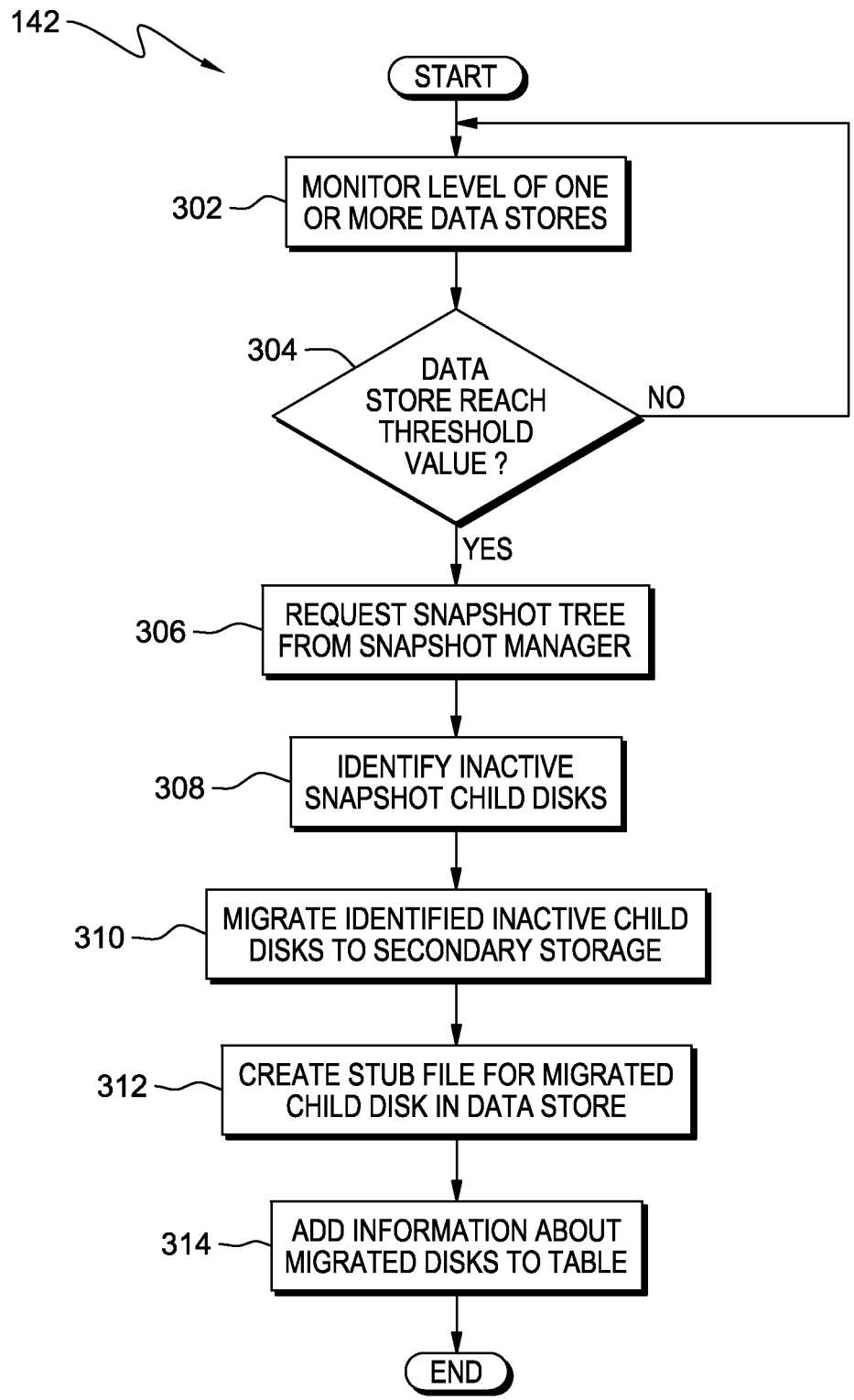
FIG. 3 is a flowchart of a method for migrating inactive snapshot child disks to secondary storage, in accordance with an embodiment of the present invention.

FIG. 3 is a flowchart of a method for migrating inactive snapshot child disks to secondary storage, in accordance with an embodiment of the present invention.

Child disk migration program 142 monitors the available storage space in one or more of the local data stores 121 providing storage to a virtual machine (step 302). If the available storage space of local data store 121 remains below a pre-defined minimum threshold value (decision block 304, NO branch), child disk migration program 142 continues to monitor the one or more local data stores. If, on the other hand, the available storage space reaches the pre-defined threshold value (decision block 304, YES branch), child disk migration program 142 proceeds to request from snapshot manager 130 snapshot tree 200, representative of virtual machine snapshots saved in local data store 121 (step 306). The pre-defined minimum threshold value may correspond to the maximum capacity of the local data store, or it may be set by a user at some lower capacity.

Child disk migration program 142 requests the information in snapshot tree 200, which is maintained by snapshot manager 130 for a virtual machine in local data store 121 (step 306). Child disk migration program 142 identifies any inactive child disks in snapshot tree 200 (step 308). All snapshots not in the active snapshot chain between the original VM disk and the currently active snapshot may be considered inactive and may be selected for migration.

Child disk migration program 142 migrates the identified inactive child disks to secondary storage 150 (step 310). Each inactive child disk is read from local data store 121 and written to secondary storage 150. Within local data store 121, a stub file for the migrated inactive child disk is created (step 312). A stub file, as discussed with reference to FIGS. 1 and 2 above, contains metadata so to a user or a program on the virtual machine, the stub file appears like a normal stored file. The stub file may also include a link to the storage location on secondary storage 150. Information regarding the child disk original location, the migration location of the child disk and the size of the child disk is stored in table 700 located in storage management module 140 (step 314).

Figure 4:
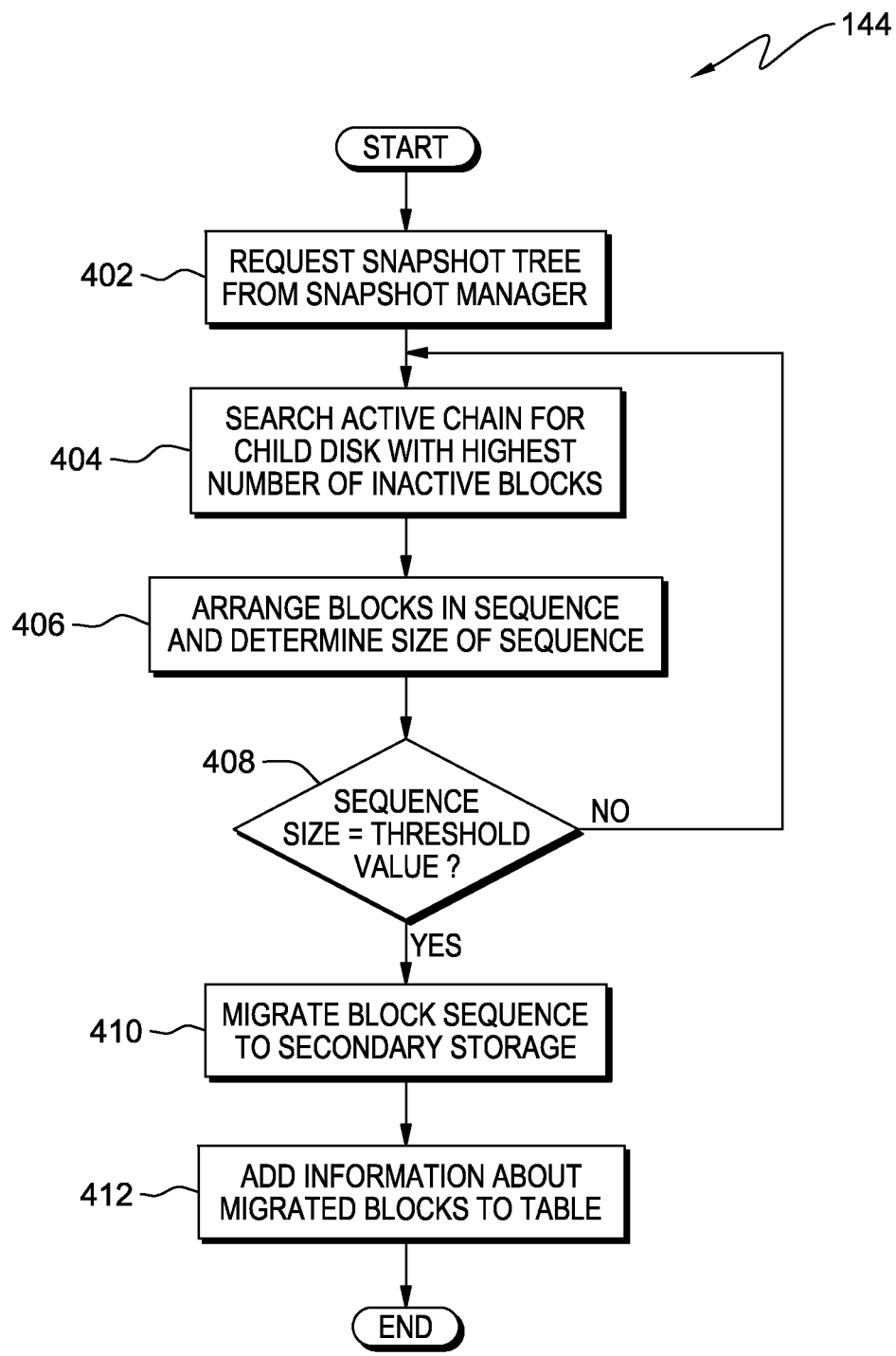
FIG. 4 is a flowchart of a method for migrating inactive block sequences to secondary storage, in accordance with an embodiment of the present invention.

FIG. 4 is a flowchart of a method for migrating inactive block sequences to secondary storage, in accordance with an embodiment of the present invention.

Block sequence migration program 144 requests current snapshot tree 200 from snapshot manager 130 (step 402). The active snapshot chain is then searched for child disks with the highest number of inactive blocks (step 404). A pre-determined threshold number of child disk generations may be set which should exist before an inactive block is deemed eligible for migration. For example, when a snapshot is deleted in local data store 121 and a previous snapshot is re-activated as the active snapshot, the re-activation of the previously inactive snapshot requires the recall of previously inactive blocks to be available for use by a user or program. Setting a threshold number of child disk generations to be met may help prevent a high frequency of recalls in such example situations.

Block sequence migration program 144 arranges the located inactive blocks in sequences and determines the size of each block sequence (step 406). A block sequence is a cohesive arrangement of blocks. If the size of the sequence meets a pre-defined threshold value (decision block 408, YES branch), then the block sequence is migrated to secondary storage 150 (step 410). The block sequence size should be higher than the space required in local data store 121 to justify the migration. The migration of small fragments, such as small block sequences, has the potential to exhaust resources rapidly. The threshold block sequence size may be set by a user or determined based on existing space requirements. If the block sequence does not meet the pre-defined threshold value (decision block 408, NO branch), block sequence migration program 144 will continue to search the active chain for child disks with high numbers of inactive blocks (step 404). For migrated inactive blocks, the location and migration information and the sequence size for each of the migrated inactive block sequences are added to table 700 maintained in storage management module 140 (step 412).

Figure 5:
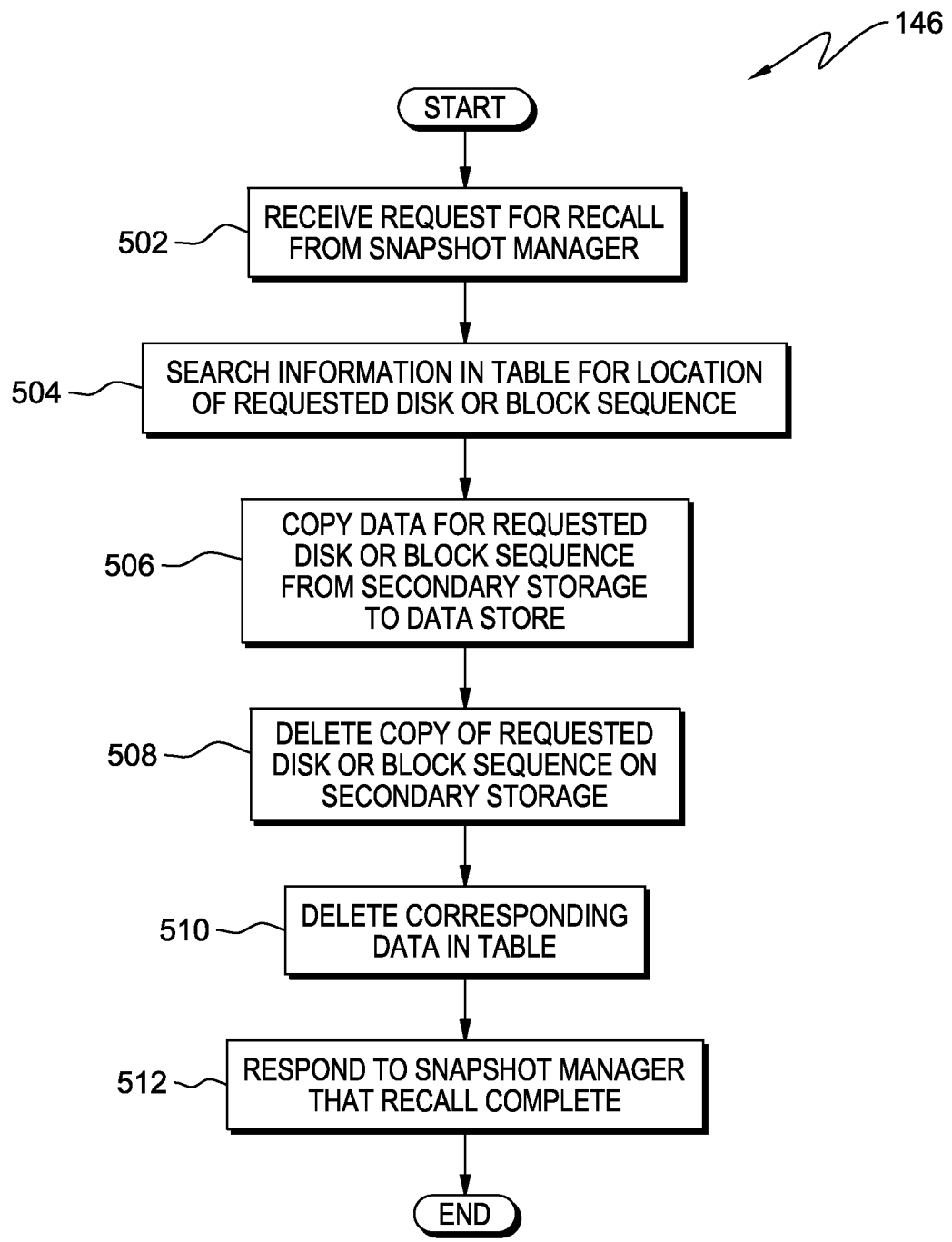
FIG. 5 is a flowchart of a method for recalling inactive snapshot child disks and inactive block sequences from secondary storage, in accordance with an embodiment of the present invention.

FIG. 5 is a flowchart of a method for recalling inactive snapshot child disks and inactive block sequences from secondary storage, in accordance with an embodiment of the present invention.

Recall program 146 receives a request from snapshot manager 130 for a recall of a child disk or block sequence (step 502). In an embodiment, a request for a recall may occur when a user accesses the stub file for the migrated inactive child disk on local data store 121. A request for recall may also occur when a child disk is deleted and the parent disk becomes active, requiring the restoration of a previously migrated inactive disk. In the case of block level migration, a request for recall may occur if a child disk is deleted and the newly active parent disk contains block sequences that were previously migrated. Recall program 146 looks in table 700, which can be maintained in storage management module 140, for information regarding the location of the requested disk or block sequence in secondary storage 150 (step 504). Alternatively, recall program 146 may locate the migrated child disk or block through the logical link included in the stub file for each migrated child disk or block on local data store 121.

Using the original location and migration location information, recall program 146 copies the data for the requested disk or block sequence from secondary storage 150 to local data store 121 (step 506). In a preferred embodiment, recall program 146 deletes the copy of the requested disk or block sequence on secondary storage 150 (step 508) and deletes the corresponding data for the recalled files in table 700 (step 510). Recall program 146 responds to snapshot manager 130 that the recall is complete (step 512).

Figure 6:
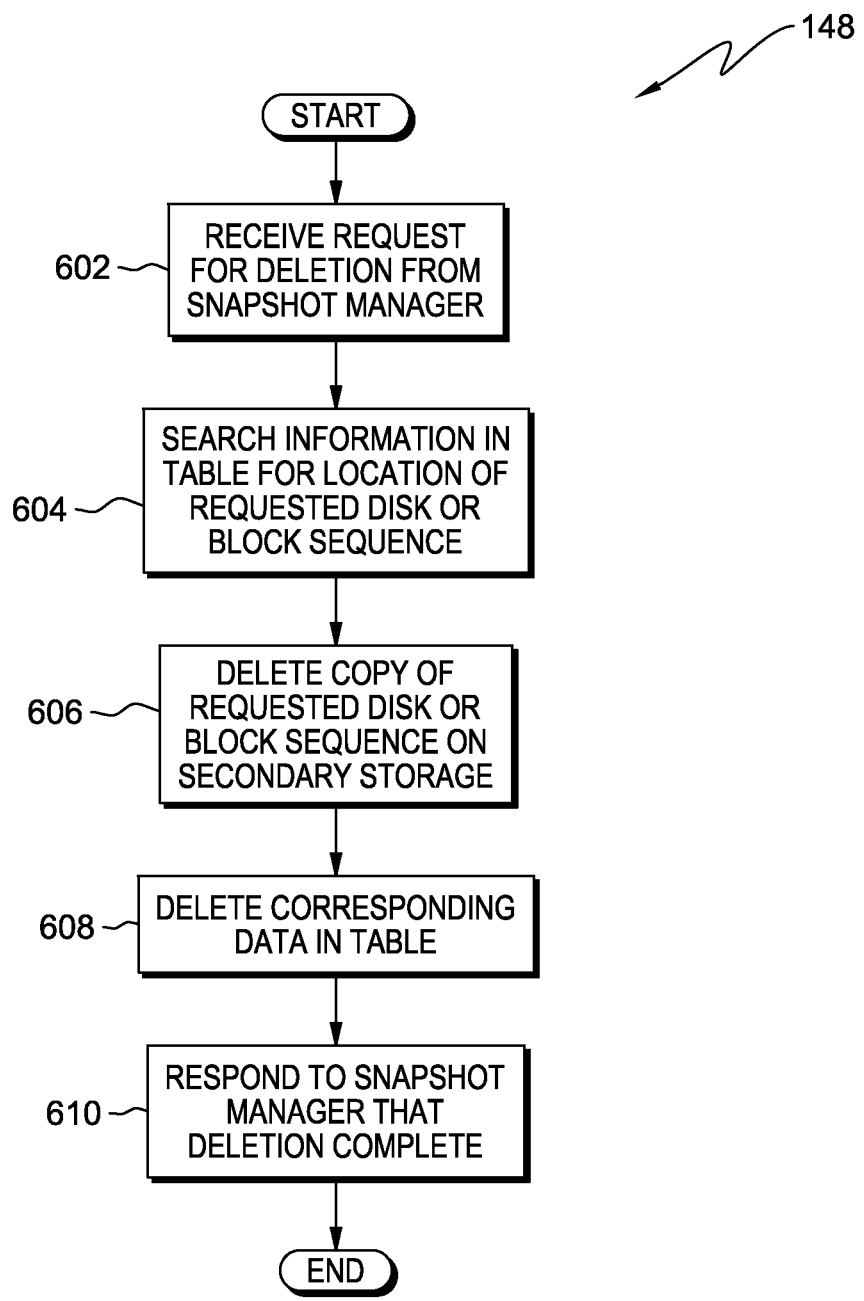
FIG. 6 is a flowchart of a method for deletion of inactive snapshot child disks and inactive block sequences from secondary storage, in accordance with an embodiment of the present invention.

FIG. 6 is a flowchart of a method for deletion of inactive snapshot child disks and inactive block sequences from secondary storage, in accordance with an embodiment of the present invention.

When a disk or block sequence stub file is deleted on local data store 121, the corresponding copies may be deleted on secondary storage 150. Additionally, when a VM disk is deleted in local data store 121 and that VM disk contains migrated inactive child disks or inactive blocks, the previously migrated files may then be deleted from secondary storage. Deletion program 148 receives a request from snapshot manager 130 for deletion of disks or block sequences (step 602). In an alternate embodiment, the request to delete a child disk or block sequence may be received from local data store 121. Deletion program 148 searches information in table 700, which can be maintained in storage management module 140, for the migration location of the requested disks or block sequences (step 604).

Deletion program 148 deletes the copy of the requested disk or block sequence on secondary storage 150 (step 606) and deletes the corresponding information in table 700 (step 608). Deletion program responds to snapshot manager 130 that deletion of the requested disk or block sequence is complete (step 610).

FIG. 7 illustrates an exemplary table of original location, migration location, and size information of migrated inactive snapshot child disks and inactive block disks, in accordance with an embodiment of the present invention.

Table 700 may be located in storage management module 140 and can be maintained by programs 142-148. Table 700 may list migrated files using a snapshot identifier, as shown in column 702. After inactive child disks and inactive block sequences are migrated from local data store 121 to secondary storage 150, for example, child disk migration program 142 and block sequence migration program 144, respectively, add original location information, shown in column 704, and migration location information, shown in column 706, to table 700. Child disk migration program 142 and block sequence migration program 144 can also add the size information of the migrated file, shown in column 708, to table 700.

Recall program 146 and deletion program 148 also can maintain information in table 700. For example, after copying the data for a requested disk from secondary storage 150 to local data store 121, recall program 146 deletes the corresponding migration data from table 700. Similarly, after deleting a requested disk from secondary storage 150, deletion program 148 deletes the corresponding data in table 700.

Figure 8:
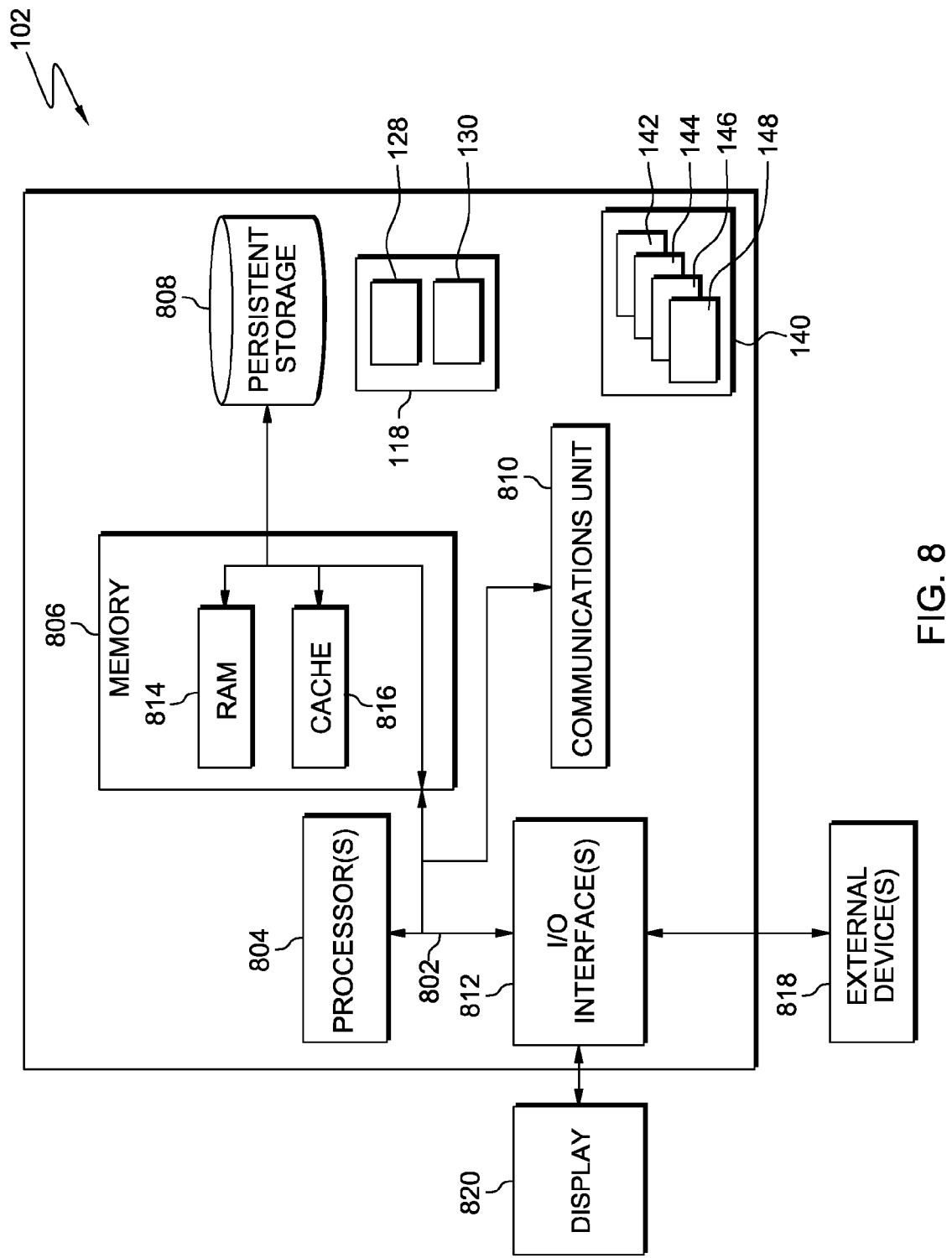
FIG. 8 depicts a block diagram of components of a computer in the virtualized computer environment, in accordance with an embodiment of the present invention.

FIG. 8 depicts a block diagram of components of computer 102 in accordance with an illustrative embodiment. It should be appreciated that FIG. 8 provides only an illustration of one implementation and does not imply any limitations with regard to the environment in which different embodiments may be implemented. Many modifications to the depicted environment may be made.

Computer 102 is representative of any electronic device capable of executing machine-readable program instructions and hosting a virtualized computer environment. Computer 102 includes communications fabric 802, which provides communications between processor(s) 804, memory 806, persistent storage 808, communications unit 810, and input/output (I/O) interface(s) 812. Processor(s) 804 include, at least in part, designated processors 120 in FIG. 1 to be shared among logical partitions.

Memory 806 and persistent storage 808 are examples of computer-readable tangible storage devices. A storage device is any piece of hardware that is capable of storing information, such as, data, program code in functional form, and/or other suitable information on a temporary basis and/or permanent basis. Memory 806 may be, for example, one or more random access memories (RAM) 814, cache memory 816, or any other suitable volatile or non-volatile storage device. Memory 806 includes, at least in part, designated memory 126 depicted in FIG. 1 to be shared among logical partitions. A computer readable storage device, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Hypervisor 118, with virtual switch 128 and snapshot manager 130, are stored in persistent storage 808 for execution and/or access by one or more of the respective processors 804 via one or more memories of memory 806. Persistent storage 808 includes, at least in part, designated storage disks 122 depicted in FIG. 1 to be shared by logical partitions. Storage management module 140 and programs 142, 144, 146, and 148 reside in portions of designated storage disks 122 or designated memory 126 allocated to respective logical partitions 104, 106, and 108. In the embodiment illustrated in FIG. 8, persistent storage 808 includes flash memory. Alternatively, or in addition to, persistent storage 808 may include a magnetic disk storage device of an internal hard drive, a solid state drive, a semiconductor storage device, read-only memory (ROM), EPROM, or any other computer-readable tangible storage device that is capable of storing program instructions or digital information.

The media used by persistent storage 808 may also be removable. For example, a removable hard drive may be used for persistent storage 808. Other examples include an optical or magnetic disk inserted into a drive for transfer onto another storage device that is also a part of persistent storage 808, or other removable storage devices such as a thumb drive or smart card.

Communications unit 810, in these examples, provides for communications with other data processing systems or devices. In these examples, communications unit 810 includes one or more network interface cards. Communications unit 810 may provide communications through the use of either or both physical and wireless communications links. In another embodiment still, computer 102 may be devoid of communications unit 810. Hypervisor 118, virtual switch 128, snapshot manager 130, storage management module 140, and programs 142, 144, 146, and 148 may be downloaded to persistent storage 808 through communications unit 810. Communications unit 810 includes, at least in part, designated network cards 124 depicted in FIG. 1 to be shared by the logical partitions.

I/O interface(s) 812 allows for input and output of data with other devices that may be connected to computer 102. For example, I/O interface 812 may provide a connection to external devices 818 such as a keyboard, keypad, a touch screen, pointing device and/or some other suitable input device. In a preferred embodiment, I/O interfaces are also shared among logical partitions. I/O interface(s) may also connect to a display 820. Display 820 provides a mechanism to display information to a user. Display 820 may be a computer display monitor or an incorporated display screen, such as is used in tablet computers.

The aforementioned programs can be written in various programming languages (such as Java® or C++) including low-level, high-level, object-oriented or non object-oriented languages. Alternatively, the functions of the aforementioned programs can be implemented in whole or in part by computer circuits and other hardware (not shown).

Aspects of the present invention have been described with respect to block diagrams and/or flowchart illustrations of methods, apparatus (system), and computer program products according to embodiments of the present invention. It will be understood that each block of the flowchart illustrations and/or block diagrams, and combinations of blocks in the flowchart illustrations and/or block diagrams, can be implemented by computer instructions. These computer instructions may be provided to a processor of a general purpose computer, special purpose computer, or other programmable data processing apparatus, such that instructions, which execute via the processor of the computer or other programmable data processing apparatus, create means for implementing the functions/acts specified in the flowchart and/or block diagram block or blocks.

Based on the foregoing, a computer system, method and program product have been disclosed in accordance with the present invention. However, numerous modifications and substitutions can be made without deviating from the scope of the present invention. Such modifications and substitutions that may be apparent to a person skilled in the art of the invention are intended to be included within the scope of the invention as defined by the accompanying claims. In this regard, each block in the flowcharts or block diagrams may represent a module, segment, or portion of code, which comprises one or more executable instructions for implementing the specified logical function(s). The foregoing description is not intended to be exhaustive nor to limit the invention to the precise form disclosed. Therefore, the present invention has been disclosed by way of example and not limitation.

What is claimed is:

1. A method for managing storage space in a virtualized computing environment, the method comprising the steps of:
   determining, by one or more computer processors, that a computer system hosting a plurality of virtual computers has reached a threshold level of minimum available storage space;
   the one or more computer processors searching the storage space of the computer system for an inactive snapshot file, wherein the inactive snapshot file includes both a snapshot child disk and data blocks within the snapshot child disk;
   the one or more computer processors locating the inactive snapshot file, wherein locating the inactive snapshot file includes determining at least one snapshot child disk with a highest number of inactive data blocks;
   the one or more computer processors arranging the inactive data blocks of the at least one snapshot child disk in one or more sequences, wherein arranging the inactive data blocks in one or more sequences includes determining whether a size of each of the one or more sequences exceeds a pre-defined threshold value; and
   the one or more computer processors, responsive to determining a size of one or more sequences exceeds the pre-defined threshold value, moving the located inactive snapshot file to a secondary storage.

2. The method of claim 1, further comprising the steps of:
   receiving a request for the one or more computer processors to restore the inactive snapshot file to the storage space of the computer system; and
   the one or more computer processors moving the inactive snapshot file from the secondary storage back to the storage space of the computer system.

3. The method of claim 1, wherein determining whether a size of each of the one or more sequences exceeds a pre-defined threshold value, further comprises one or more processors determining based, at least in part, on an existing space requirement in a local data store, a threshold block sequence size, such that a block sequence exceeds the threshold block sequence size when the block sequence size is higher than the existing space requirement in the local data store.

4. The method of claim 1, further comprising the step of the one or more computer processors creating a stub file in the storage space of the computer system, the stub file containing metadata of the inactive snapshot file.

5. The method of claim 1, wherein the secondary storage is connected to the computer system via a storage area network (SAN) or provided through a network file system (NFS).

6. The method of claim 2, wherein the step of the one or more computer processors receiving the request to restore the inactive snapshot file comprises:
   the one or more computer processors receiving a request to access the inactive snapshot file in the storage space of the computer system; and
   responsive to the one or more computer processors determining the storage space of the computer system contains only a stub file for the inactive snapshot file, searching a table for a location of the inactive snapshot file in the secondary storage.

7. A computer program product to manage storage space in a virtualized computing environment, the computer program product comprising:
   one or more computer-readable storage devices and program instructions stored on at least one of the one or more computer-readable storage devices, wherein the one or more computer-readable storage devices are not transitory signals per se, the program instructions comprising:
   program instructions to determine that a computer system hosting a plurality of virtual computers has reached a threshold level of minimum available storage space;
   program instructions to search the storage space of the computer system for an inactive snapshot file, wherein the inactive snapshot file includes both a snapshot child disk and data blocks within the snapshot child disk;
   program instructions to locate the inactive snapshot file, wherein locating the inactive snapshot file includes determining at least one snapshot child disk with a highest number of inactive data blocks;
   program instructions to arrange the inactive data blocks of the at least one snapshot child disk in one or more sequences, wherein arranging the inactive data blocks in one or more sequences includes determining whether a size of each of the one or more sequences exceeds a pre-defined threshold value; and responsive to determining a size of one or more sequences exceeds the pre-defined threshold value, program instructions to move the located inactive snapshot file to a secondary storage.

8. The computer program product of claim 7, further comprising:
program instructions to receive a request to restore the inactive snapshot file to the storage space of the computer system; and
program instructions to move the inactive snapshot file from the secondary storage back to the storage space of the computer system.

9. The computer program product of claim 7, further comprising program instructions to create a stub file in the storage space of the computer system, the stub file containing metadata of the inactive snapshot file.

10. The computer program product of claim 7, wherein the secondary storage is connected to the computer system via a storage area network (SAN) or provided through a network file system (NFS).

11. The computer program product of claim 8, wherein the program instructions to receive the request to restore the inactive snapshot file comprise:
program instructions to receive a request to access the inactive snapshot file in the storage space of the computer system; and
program instructions to, responsive to determining the storage space of the computer system contains only a stub file for the inactive snapshot file, search a table for a location of the inactive snapshot file in the secondary storage.

12. A computer system to manage storage space in a virtualized computing environment, the computer system comprising:
one or more processors, one or more computer-readable memories, one or more computer-readable tangible storage devices, and program instructions stored on at least one of the one or more storage devices for execution by at least one of the one or more processors via at least one of the one or more memories, the program instructions comprising:
program instructions to determine that a computer system hosting a plurality of virtual computers has reached a threshold level of minimum available storage space;
program instructions to search the storage space of the computer system for an inactive snapshot file, wherein the inactive snapshot file includes both a snapshot child disk and data blocks within the snapshot child disk;
program instructions to locate the inactive snapshot file, wherein locating the inactive snapshot file includes determining at least one snapshot child disk with a highest number of inactive data blocks;
program instructions to arrange the inactive data blocks of the at least one snapshot child disk in one or more sequences, wherein arranging the inactive data blocks in one or more sequences includes determining whether a size of each of the one or more sequences exceeds a pre-defined threshold value; and
responsive to determining a size of one or more sequences exceeds the pre-defined threshold value, program instructions to move the located inactive snapshot file to a secondary storage.

13. The computer system of claim 12, further comprising:
program instructions to receive a request to restore the inactive snapshot file to the storage space of the computer system; and
program instructions to move the inactive snapshot file from the secondary storage back to the storage space of the computer system.

14. The computer system of claim 12, further comprising program instructions to create a stub file in the storage space of the computer system, the stub file containing metadata of the inactive snapshot file.

15. The computer system of claim 12, wherein the secondary storage is connected to the computer system via a storage area network (SAN) or provided through a network file system (NFS).

16. The computer system of claim 13, wherein the program instructions to receive the request to restore the inactive snapshot file comprise:
program instructions to receive a request to access the inactive snapshot file in the storage space of the computer system; and
program instructions to, responsive to determining the storage space of the computer system contains only a stub file for the inactive snapshot file, search a table for a location of the inactive snapshot file in the secondary storage.

* * * * *